(12) United States Patent
Tarumi et al.

(10) Patent No.: US 6,218,499 B1
(45) Date of Patent: Apr. 17, 2001

(54) CURABLE COMPOSITIONS

(75) Inventors: Yasuo Tarumi; Shinichi Sato; Noriyuki Koike; Takashi Matsuda; Masatoshi Arai, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/255,861

(22) Filed: Feb. 23, 1999

(30) Foreign Application Priority Data

Feb. 23, 1998 (JP) .................................................. 10-057496

(51) Int. Cl.$^7$ .................................................... C08G 77/24
(52) U.S. Cl. ................................ 528/42; 528/30; 528/33; 528/34; 528/36; 528/37; 528/38; 556/413; 556/450; 556/457; 556/458; 556/459; 556/464
(58) Field of Search ................................. 528/30, 33, 34, 528/36, 37, 38, 42; 556/413, 450, 457, 458, 459, 464

(56) References Cited

U.S. PATENT DOCUMENTS 4,973,623   11/1990   Haugsby et al. .
5,352,752   10/1994   Koike et al. .
5,705,591   1/1998   Matsuda et al. .

FOREIGN PATENT DOCUMENTS 399682   11/1990   (EP) .
745604   12/1996   (EP) .

OTHER PUBLICATIONS

European Search Report dated Oct. 20, 1999.

Primary Examiner—Robert Dawson
Assistant Examiner—Kuo-Liang Peng
(74) Attorney, Agent, or Firm—Millen, White, Zelano & Branigan, P.C.

(57) ABSTRACT

A curable composition comprising (A) a fluorinated organic silicon compound of the formula: $Z-R^1-Rf-R^1-Z$ wherein Rf is a divalent fluorinated polyether group, $R^1$ is a divalent hydrocarbon group, and Z is a silyl or siloxane group terminated with OH, (B) an organic silicon compound as a crosslinking agent, and (C) a condensation accelerator is curable to depth at room temperature even in the absence of moisture.

14 Claims, 2 Drawing Sheets

CURABLE COMPOSITIONS

This invention relates to curable compositions of the condensation curing type which yield fluorine-modified silicone rubber.

BACKGROUND OF THE INVENTION

Silicone rubber compositions of the condensation curing type comprising an organopolysiloxane terminated with Si—OH groups as a base polymer and a silicon compound having a hydrolyzable group such as vinyltriacetoxysilane and vinyltriisopropenoxysilane as a crosslinking agent are used in a variety of applications. Such curable silicone rubber compositions of the one package type cure through the mechanism that condensation reaction takes place between Si—X groups (wherein X is typically acetoxy or isopropenoxy) in the crosslinking agent and Si—OH groups at the terminus of the base polymer to form siloxane bonds and then, excessive Si—X groups undergo hydrolytic condensation reaction under the action of moisture in the ambient atmosphere. In two package type compositions wherein the amount of the crosslinking agent used is equivalent to the amount of Si—OH groups at the terminus of the base polymer, curing can be completed solely by the condensation reaction between Si—OH groups and Si—X groups. In this case, moisture in the ambient atmosphere is not particularly required.

Also known from JP-A 234923/1994 is a fluorine-modified silicone rubber composition of the condensation curing type comprising an oily base polymer in the form of a fluorinated polyether having Si—OCH$_3$ groups incorporated at its terminus. More particularly, this composition contains a compound of the following formula as the main component and cures through hydrolytic condensation of Si—OCH$_3$ groups with moisture in the ambient atmosphere.

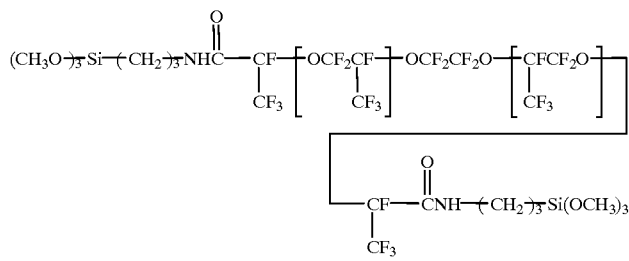

The resulting fluorine-modified silicone rubber is superior with respect to solvent resistance, chemical resistance, and stain resistance, as compared with prior art silicon rubber based on dimethylpolysiloxane. This silicone rubber, however, has the drawbacks that its moisture permeability is low because it is a polymer having a high fluorine content and that curing to the depth takes a long time because moisture in the ambient atmosphere is requisite for curing.

SUMMARY OF THE INVENTION

An object of the present invention is to provide a novel and improved curable composition of the condensation curing type, typically fluorine-modified silicone rubber composition, which is curable at room temperature without a need for moisture.

We have found that a novel fluorinated polyether having Si—OH groups at both ends is obtained by subjecting a fluorinated polyether having ethylenically unsaturated groups at both ends and an organic silicon compound having at least two Si—H groups in a molecule to addition reaction (or hydrosilylation reaction) in the presence of a catalyst to produce a fluorinated polyether having Si—H groups at both ends, then subjecting the fluorinated polyether having Si—H groups at both ends and H$_2$O to dehydrogenation reaction in the presence of a catalyst to convert the Si—H groups to Si—OH groups; or by subjecting a fluorinated polyether having ethylenically unsaturated groups at both ends and an organic silicon compound having both Si—H and Si—X groups in a molecule (wherein X is a hydrolyzable group) to addition reaction to produce a fluorinated polyether having Si—X groups at both ends, then effecting hydrolysis to convert the Si—X groups to Si—OH groups. When the novel fluorinated polyether having Si—OH groups at both ends is used as the base polymer, there is obtained a fluorine-modified silicone rubber composition which is fully curable to the deep interior even in the absence of moisture. The present invention is predicated on this finding.

According to the present invention, there is provided a curable composition comprising (A) a fluorinated organic silicon compound of the following general formula (1), (B) an organic silicon compound of the following general formula (5), (6) or (7), and (C) a condensation accelerator.

$$Z—R^1—Rf—R^1—Z \quad (1)$$

In formula (1), Rf is a divalent fluorinated polyether group. $R^1$ is a substituted or unsubstituted divalent hydrocarbon group which may be separated by at least one atom selected from the group consisting of oxygen, nitrogen, silicon and sulfur atoms, and which may contain an amide or sulfonamide bond. Z is a group of the following general formula (2), (3) or (4):

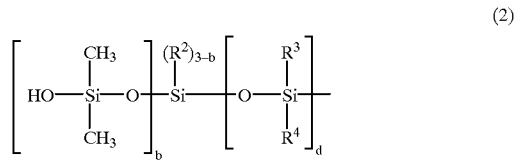

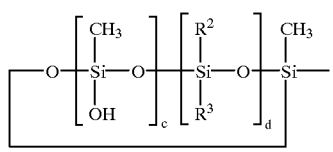
(3)

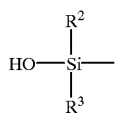
(4)

wherein $R^2$, $R^3$, and $R^4$ are independently monovalent organic groups, letters b and c each are equal to 1, 2 or 3, and d is an integer of 0 to 3.

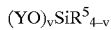
(5)

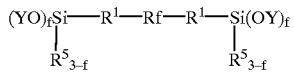
(6)

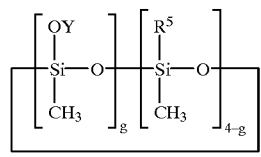
(7)

In formulae (5) to (7), Y is a monovalent organic group selected from the group consisting of $CH_3$—, $C_2H_5$—, $C_3H_7$—, $CF_3CH_2$—, $CH_3CO$—, $CH_2$=$C(CH_3)$—, $CH_3CH_2C(CH_3)$=N—,

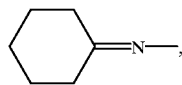

$(CH_3)_2N$—, $(C_2H_5)_2N$—, $CH_2$=$C(OC_2H_5)$—, and $(CH_3)_2C$=$C(OC_8H_{17})$—. $R^5$ is a monovalent organic group. $R^1$ and Rf are as defined above. Letter e is equal to 2 or 3, f is equal to 1, 2 or 3, and g is equal to 2 or 3.

Figure 1:
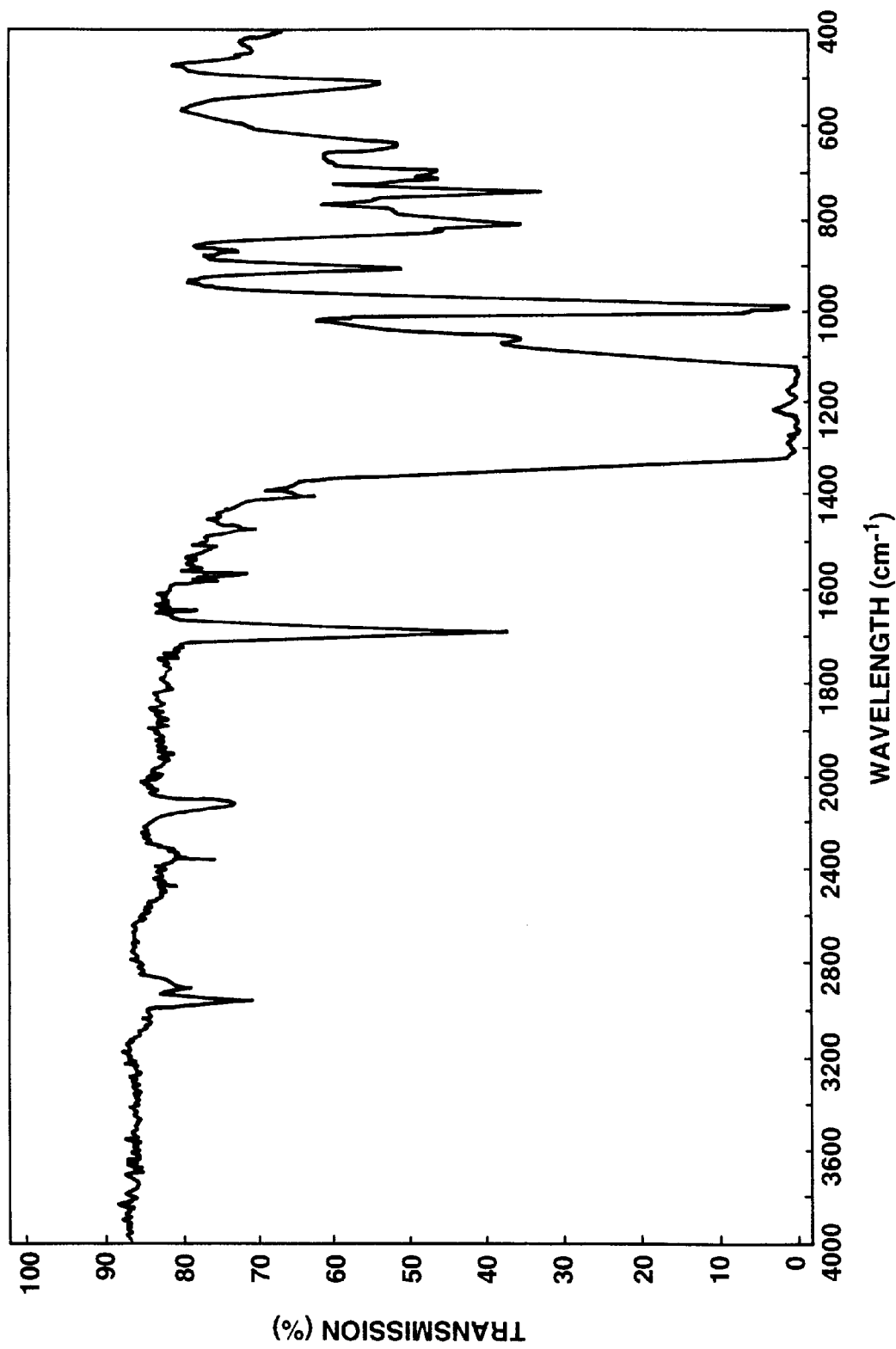
FIG. 1 is a diagram showing the IR absorption spectrum of the compound of formula (ii).

DETAILED DESCRIPTION OF THE INVENTION (A) Fluorinated organic silicon compound

The fluorinated organic silicon compound as component (A) of the curable composition according to the invention is a fluorinated polyether having Si—OH groups at both ends as represented by the above formula (1).

In formula (1), Rf represents divalent fluorinated polyether groups, for example, groups of the following formula:

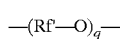
(8)

wherein Rf' is a straight or branched perfluoroalkylene group having 1 to 6 carbon atoms, preferably 1 to 3 carbon atoms, and q is an integer of 1 to 200, preferably 2 to 150, more preferably 2 to 100. Examples of the recurring units represented by —(Rf'—O)— include —$CF_2O$—, —$CF_2CF_2O$—, —$CF_2CF_2CF_2O$—, —$C(CF_3)FCF_2O$—, —$CF_2CF_2CF_2CF_2O$—, —$CF_2CF_2CF_2CF_2CF_2CF_2O$—, and —$C(CF_3)_2O$—, with —$CF_2O$—, —$CF_2CF_2O$—, —$CF_2CF_2CF_2O$—, and —$C(CF_3)FCF_2O$— being preferred. The perfluoropolyether structure may consist of recurring units —(Rf'—O)— of one type or two or more different types.

Illustrative examples of Rf' are given below.

—$C_4F_8$—

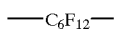
—$C_6F_{12}$—

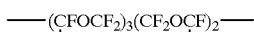

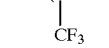

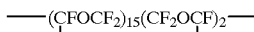

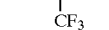

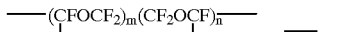
$\overline{n+m} = 38$

—$CF_2CF_2OCF_2(CF_2)_2CF_2OCF_2CF_2$—

—$CF_2CF_2OCF_2CFOCF_2(CF_2)_2CF_2OCFCF_2OCF_2CF_2$—

—$CF_2(OCF_2CF_2)_n(OCF_2)_mOCF_2$—

$\overline{n} = 5$ to 50, e.g., 8.
$\overline{m} = 1$ to 10, e.g., 2.

$\overline{n} = 5$ to 50, e.g., 15.
$\overline{m} = 1$ to 10, e.g., 2.

—$CF_2CF_2(OCF_2CF_2CF_2)_nOCF_2CF_2$—

$\overline{n} = 5$ to 100, e.g., 10.

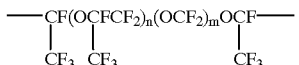

$\overline{n+m} = 2$ to 200,
preferably 30 to 110.

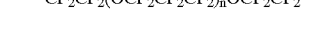

$\overline{n+m} = 20$ to 110, e.g., 30.

In formula (1), $R^1$ is a divalent hydrocarbon group, specifically a substituted or unsubstituted divalent hydrocarbon group which may be separated by at least one atom selected from among oxygen, nitrogen, silicon and sulfur atoms, and which may contain an amide or sulfonamide bond. The divalent hydrocarbon groups are preferably those of 2 to 20 carbon atoms. Examples of the substituted or unsubstituted divalent hydrocarbon group which is not separated by an oxygen, nitrogen, silicon or sulfur atom, and which does not contain an amide or sulfonamide bond include alkylene groups such as ethylene, propylene, methylethylene, butylene, and hexamethylene; cycloalkylene groups such as cyclohexylene; arylene groups such as phenylene, tolylene, xylylene, naphthylene, and biphenylene; combinations of the alkylene groups with the arylene groups; and substituted ones of the alkylene and arylene groups in which some or all of the hydrogen atoms are replaced by halogen atoms.

In the divalent hydrocarbon groups, the oxygen atom may intervene in the form of —O—, the nitrogen atom may intervene in the form of —NR— or —N═ wherein R is hydrogen, alkyl of 1 to 10 carbon atoms, or aryl, the silicon atom may intervene in the form of —SiR'R"— wherein R' and R" each are alkyl of 1 to 10 carbon atoms or aryl, and the sulfur atom may intervene in the form of —S—. And the amide group may intervene in the form of —CONR— wherein R is as defined above, and the sulfonamide group may intervene in the form of —SO$_2$NR— wherein R is as defined above. Examples of the divalent hydrocarbon group which is separated by an oxygen, nitrogen, silicon or sulfur atom or which contains an amide or sulfonamide bond are given below. Note that in the following formulae, Me is methyl, Ph is phenyl, and Rf and Z are attached to the left and right sides of each formula, respectively.

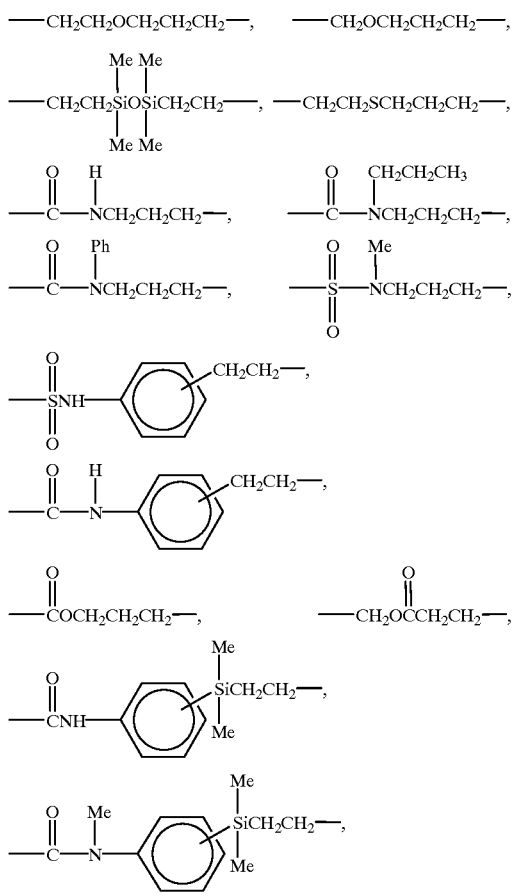

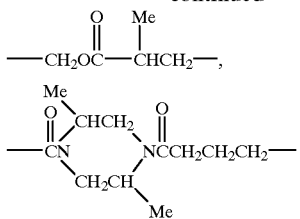

In formula (1), Z is a group of the above formula (2), (3) or (4).

In formulae (2), (3) and (4), $R^2$, $R^3$, and $R^4$, which may be the same or different, are monovalent organic groups, letters b and c each are equal to 1, 2 or 3, and d is an integer of 0 to 3.

The organic groups represented by $R^2$, $R^3$, and $R^4$ include substituted or unsubstituted monovalent hydrocarbon groups, preferably of 1 to 12 carbon atoms, for example, alkyl groups such as methyl, ethyl, propyl, isopropyl, butyl, isobutyl, tert-butyl, pentyl, neopentyl, hexyl, heptyl, octyl, nonyl, and decyl; cycloalkyl groups such as cyclopentyl, cyclohexyl, and cycloheptyl; aryl groups such as phenyl, tolyl, xylyl, and naphthyl; aralkyl groups such as benzyl, phenylethyl, and phenylpropyl; and substituted ones of these groups in which some or all of the hydrogen atoms are replaced by halogen atoms (e.g., fluorine, chlorine and bromine), such as chloromethyl, bromoethyl, chloropropyl, trifluoropropyl, and 3,3,4,4,5,5,6,6,6-nonafluorohexyl.

The fluorinated organic silicon compounds of formula (1) can be obtained in accordance with the reaction scheme shown below, by subjecting a fluorinated polyether compound having ethylenically unsaturated groups at both ends and a silane or siloxane compound having at least two Si—H groups in a molecule or a silane or siloxane compound having a Si—H group and a hydrolyzable silyl group (represented by Si—X wherein X is a hydrolyzable group such as a halogen atom or alkoxy) to addition reaction (or hydrosilylation reaction) between the ethylenically unsaturated groups (CH$_2$═CH—) in the former and the Si—H group in the latter in the presence of an addition reaction catalyst, to thereby form a fluorinated polymer having Si—E or Si—X groups at both ends; and subjecting the fluorinated polymer having Si—H or Si—X groups at both ends to dehydrogenation reaction in the presence of a catalyst or hydrolysis, to thereby form a compound having Si—OH groups at both ends of formula (1).

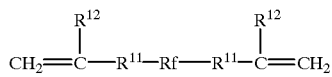

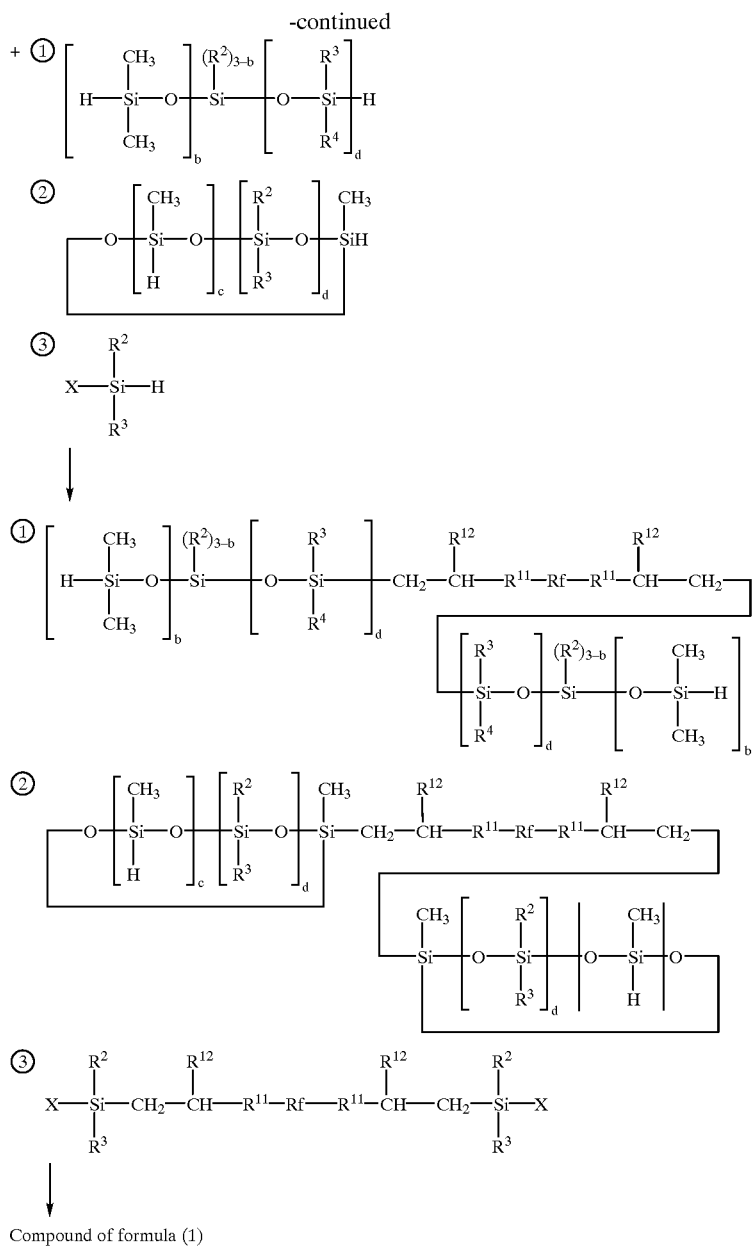

Compound of formula (1)

It is noted that in the above formulae, $-CH_2-CH(R^{12})-R^{11}-$ designates $R^1$.

In the above reaction scheme, addition reaction, dehydrogenation reaction and hydrolysis can be carried out in a conventional manner.

(B) Organic silicon compound

The organic silicon compound as component (B) of the curable composition according to the invention is a compound having in a molecule at least two Si—OY groups capable of condensation reaction with Si—OH groups without a need for moisture, as represented by the above general formula (5), (6) or (7).

In formulae (5), (6), and (7), Y is a monovalent organic group selected from the following groups. These groups form Si—OY groups which undergo condensation reaction with Si—OH groups.

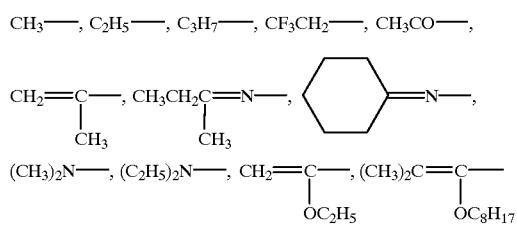

$R^5$ represents monovalent organic groups, preferably substituted or unsubstituted monovalent hydrocarbon groups, especially of 1 to 12 carbon atoms, for example, alkyl groups such as methyl, ethyl, propyl, isopropyl, butyl, isobutyl, tert-butyl, pentyl, neopentyl, hexyl, heptyl, octyl, nonyl, and decyl; cycloalkyl groups such as cyclopentyl, cyclohexyl, and cycloheptyl; aryl groups such as phenyl, tolyl, xylyl, and naphthyl; aralkyl groups such as benzyl, phenylethyl, and phenylpropyl; alkenyl groups such as vinyl, allyl, propenyl, and butenyl; and substituted ones of these groups in which some or all of the hydrogen atoms are replaced by halogen atoms (e.g., fluorine, chlorine and bromine), such as chloromethyl, bromoethyl, chloropropyl, trifluoropropyl, and 3,3,4,4,5,5,6,6,6-nonafluorohexyl.

$R^5$ may also be a group of the general formula (9).

$$Rf^2—R^1—\qquad(9)$$

Herein $Rf^2$ is a monovalent fluorinated polyether group, examples of which include the groups represented by Rf which are blocked at one end with $CF_3O—$, $CF_3CF_2O—$, $CF_3CF_2CF_2O—$, $(CF_3)_2CFO—$, $CF_3CF_2CF_2CF_2O—$ or the like. $R^1$ is as defined above.

In formula (6), $R^1$ and Rf are as defined above. Letter e is equal to 2 or 3, f is equal to 1, 2 or 3, and g is equal to 2 or 3.

The organic silicon compounds (B) function as a crosslinking agent and may be used alone or in admixture of two or more. An appropriate blending ratio of components (A) and (B) is such that the ratio of the moles of Si—OY groups in component (B) to the moles of Si—OH groups in component (A), that is, Si—OY/Si—OH, may range from 0.2 to 5.0, preferably from 0.5 to 3.0.

(C) Condensation accelerator

The condensation accelerator (C) has the function of accelerating the condensation reaction between Si—OH groups and Si—OY groups. Exemplary accelerators include metal salts or amine salts of organic carboxylic acids such as lead 2-ethyloctoate, dibutyltin dimethoxide, dibutyltin diacetate, dibutyltin dilaurate, butyltin tri-2-ethylhexoate, iron 2-ethylhexoate, cobalt 2-ethylhexoate, manganese 2-ethylhexoate, zinc 2-ethylhexoate, stannous caprylate, tin naphthenate, tin oleate, tin butyrate, titanium naphthenate, zinc naphthenate, cobalt naphthenate, zinc stearate, ammonium trifluoroacetate, and the diethylamine salt of trifluoroacetic acid; organic acids such as para-toluenesulfonic acid, trifluoroacetic acid, trichloroacetic acid, and picric acid; esters of organic titanic acids such as tetrabutyl titanate, tetra-2-ethylhexyl titanate, triethanolamine titanate, and tetra(isopropenyloxy) titanate; organic titanium compounds such as organosiloxytitanium and β-carbonyltitanium; alkoxyaluminum compounds; aminoalkyl-substituted alkoxysilanes such as 3-aminopropyltriethoxysilane and N-(trimethoxysilylpropyl)ethylenediamine; amine compounds and salts thereof such as hexylamine and dodecylamine phosphate; quaternary ammonium salts such as benzyltriethylammonium acetate; alkali metal salts of lower fatty acids such as potassium acetate, sodium acetate, and lithium oxalate; dialkylhydroxylamines such as dimethylhydroxylamine and diethylhydroxylamine; and guanidyl compounds such as tetramethylguanidine and silanes or siloxanes having a guanidyl group as shown below.

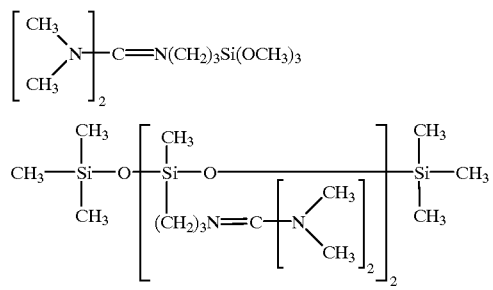

Of these, the tin compounds, titanium compounds, organic acids, and guanidyl compounds are preferred. The guanidyl compounds are especially preferred because they assist in rapidly curing the composition and improve the adhesion of cured composition. These accelerators may be used alone or in admixture of two or more.

An appropriate amount of the curing accelerator (C) used is usually about 0.01 to about 5 parts, preferably about 0.05 to about 2 parts by weight per 100 parts by weight of components (A) and (B) combined.

Additives

Various additives may be added to the composition for the purpose of adjusting the physical properties of cured composition and other purposes. Such additives include storage stabilizers such as methyltrimethoxysilane, methyltripropenoxysilane, vinyltributanoximesilane and methyltriacetoxysilane; reinforcing fillers such as fumed silica, precipitated silica, titanium dioxide, aluminum oxide, quartz flour, carbon powder, talc, and bentonite; fibrous fillers such as asbestos, glass fibers, and organic fibers; colorants such as pigments and dyestuffs; heat resistance modifiers such as red iron oxide and cerium oxide; freeze resistance modifiers; dehydrating agents; rust-preventing agents; tackifiers such as β-(3,4-epoxycyclohexyl) ethyltrimethoxysilane, γ-glycidoxypropyltriethoxysilane, γ-methacryloxypropyltrimethoxysilane, γ-methacryloxypropylmethyldiethoxysilane, N-β-(aminoethyl)-γ-aminopropyltrimethoxysilane, γ-aminopropyltriethoxysilane, γ-chloropropyltrimethoxysilane, γ-mercaptopropyltrimethoxysilane, and γ-isocyanatopropyltriethoxysilane; and liquid reinforcements such as network polysiloxanes consisting of triorganosiloxy units and $SiO_2$ units.

Preparation of curable composition

The curable composition of the invention may be formulated to either one or two package type. The composition of the one package type may be prepared by uniformly mixing components (A) to (C) and optional additives in a dry atmosphere. When the composition is formulated to the two package type, one package is a liquid containing component (A) and the other package is a liquid containing components (B) and (C) wherein these two liquids are mixed on use. In the case of the two package type, an applicator comprising a pair of cartridges and equipped with a nozzle having a mixer built-in is useful. The cartridges are filled with equal volumes of the two liquids. Then the two liquids are mixed at 1:1 and extruded through the nozzle. In this sense, the two package type has the advantage of ease of operation. The temperature during mixing may range from room temperature to about 60° C.

Cured products resulting from the curable compositions of the invention are useful, for example, as automotive oil seals, sealing members for chemical equipment, sealing members for electric and electronic parts, and potting compounds.

The compositions of the invention are curable at room temperature even in the absence of moisture and fully cure to the depth.

EXAMPLE

Examples of the invention are given below by way of illustration and not by way of limitation. All parts are by weight.

Example 1

Composition 1 was prepared by mixing 100 parts of a fluorinated organic silicon compound of formula (9) shown below, 30.9 parts of an organic silicon compound of formula (10) shown below, 0.6 part of dibutyltin dimethoxide, 19.6 parts of ground silica having a mean particle size of 1.5 μm, and 0.57 part of N-β-(aminoethyl)-γ-aminopropyltrimethoxysilane in a mixer, followed by vacuum deaeration.

parts of vinyltrimethoxysilane, 0.3 part of dibutyltin dimethoxide, and 15 parts of ground silica having a mean particle size of 1.5 μm in a mixer, followed by deaeration.

Composition 2 was cured as in Example 1. The cured rubber sheet was measured for physical properties, finding a JIS-A hardness of 26, a tensile strength of 9.4 kgf/cm$^2$, and an elongation of 150%.

Example 3

Composition 3 was prepared by mixing 100 parts of the fluorinated organic silicon compound of formula (9), 1.13 parts of vinyltriisopropenoxysilane, 0.2 part of [(CH$_3$)$_2$N]$_2$C=N(CH$_2$)$_3$Si(OCH$_3$)$_3$, and 15 parts of ground silica having a mean particle size of 1.5 μm in a mixer, followed by deaeration.

Composition 3 was cured as in Example 1. The cured rubber sheet was measured for physical properties, finding a JIS-A hardness of 26, a tensile strength of 11.0 kgf/cm$^2$, and an elongation of 190%.

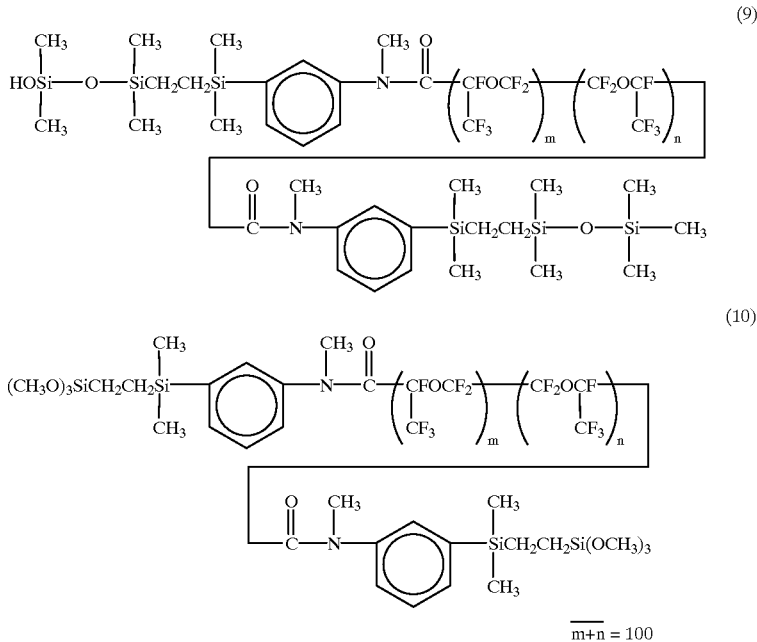

(9)

(10)

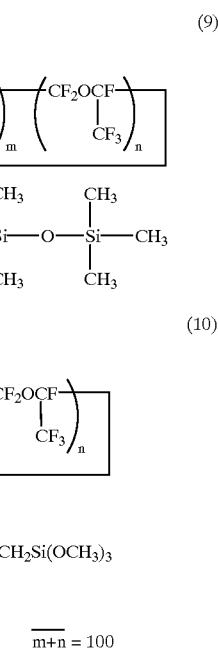

$\overline{m+n} = 100$

Composition 1 was worked into a sheet of 2 mm thick, which was cured at room temperature (25° C.) for 7 days. The cured rubber sheet was measured for physical properties, finding a hardness of 25 on JIS-A hardness scale, a tensile strength of 16.3 kgf /cm$^2$, and an elongation of 280%. Composition 1 was also cured to an aluminum plate at 25° C. for 7 days whereupon the cured composition firmly adhered to the aluminum plate.

Example 2

Composition 2 was prepared by mixing 100 parts of the fluorinated organic silicon compound of formula (9), 1.48

Example 4

Composition 4 was prepared by mixing 100 parts of the fluorinated organic silicon compound of formula (9), 11.4 parts of the organic silicon compound of formula (10), 26.5 parts of an organic silicon compound of formula (11) shown below, 0.6 part of dibutyltin dimethoxide, 20.7 parts of ground silica having a mean particle size of 1.5 μm, 11.0 parts of fumed silica having a specific surface area of 200 m$^2$/g and trimethylsilyl ((CH$_3$)$_3$Si—) treated on the surface, 0.49 part of N-β-(aminoethyl)-γ-aminopropyltrimethoxysilane, and 0.26 part of [(CH$_3$)$_2$N]$_2$C=N(CH$_2$)$_3$Si(OCH$_3$)$_3$ in a mixer, followed by deaeration.

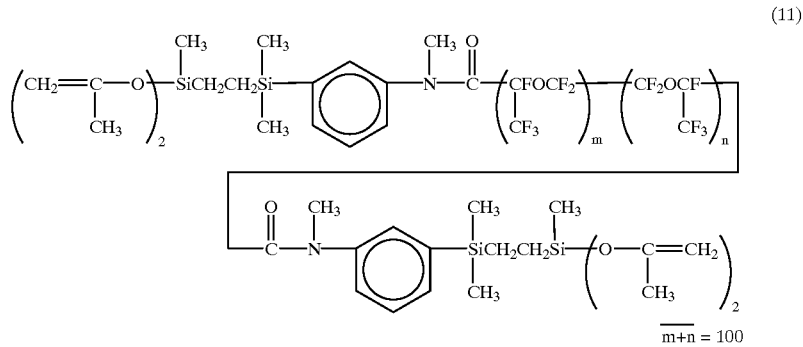

(11)

Composition 4 was cured as in Example 1. The cured rubber sheet was measured for physical properties, finding a JIS-A hardness of 43, a tensile strength of 45 kgf/cm$^2$, and an elongation of 180%.

Example 5

The cured product of Composition 1 obtained in Example 1 was immersed in a mixture of 85 vol % cyclohexanone and 15 vol % 2,2,4-trimethylpentane at 25° C. for 3 days for examining a swelling factor. A weight change of +2.4% and a volume change of +5.9% were found. It is thus evident that the fluorine-modified silicone rubber resulting from the composition of the invention has excellent solvent resistance.

Example 6

Composition 6 was prepared by mixing 100 parts of a fluorinated organic silicon compound of formula (12) shown below, 30.9 parts of the organic silicon compound of formula (10), 0.6 part of dibutyltin dimethoxide, 19.6 parts of ground silica having a mean particle size of 1.5 μm, and 0.57 part of N-β-(aminoethyl)-γ-aminopropyltrimethoxysilane in a mixer, followed by vacuum deaeration.

parts of vinyltrimethoxysilane, 0.5 part of dibutyltin dilaurate, and 15 parts of ground silica having a mean particle size of 1.5 μm in a mixer, followed by deaeration.

Composition 7 was cured as in Example 6. The cured rubber sheet was measured for physical properties, finding a JIS-A hardness of 24, a tensile strength of 9.0 kgf/cm$^2$, and an elongation of 210%.

Example 8

Composition 8 was prepared by mixing 100 parts of the fluorinated organic silicon compound of formula (12), 11.4 parts of the organic silicon compound of formula (10), 26.5 parts of the organic silicon compound of formula (11), 0.6 part of dibutyltin dimethoxide, 0.3 part of a trimethoxysilane represented by $[(CH_3)_2N]_2C=N(CH_2)_3Si(OCH_3)_3$, 20.7 parts of ground silica having a mean particle size of 1.5 μm, and 11.0 parts of fumed silica having a specific surface area of 200 m$^2$/g and trimethylsilyl ($(CH_3)_3Si-$) treated on the surface in a mixer, followed by deaeration.

Composition 8 was cured as in Example 6. The cured rubber sheet was measured for physical properties, finding a JIS-A hardness of 40, a tensile strength of 38 kgf/cm$^2$, and an elongation of 240%.

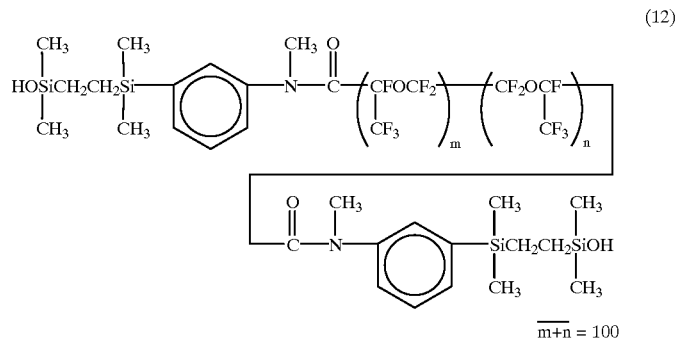

(12)

Composition 6 was worked into a sheet of 2 mm thick, which was cured at room temperature (25° C.) for 7 days. The cured rubber sheet was measured for physical properties, finding a JIS-A hardness of 23, a tensile strength of 14.2 kgf/cm$^2$, and an elongation of 320%.

Example 7

Composition 7 was prepared by mixing 100 parts of the fluorinated organic silicon compound of formula (12), 1.48

Example 9

Composition 9 was prepared by mixing 100 parts of the fluorinated organic silicon compound of formula (12), 19.6 parts of an organic silicon compound of formula (13) shown below, 0.6 part of dibutyltin dilaurate, 0.54 part of N-β-(aminoethyl)-γ-aminopropyltriethoxysilane, 18.0 parts of ground silica having a mean particle size of 1.5 μm, and 9.6 parts of fumed silica having a specific surface area of 200 m²/g and trimethylsilyl-treated on the surface in a mixer, followed by deaeration.

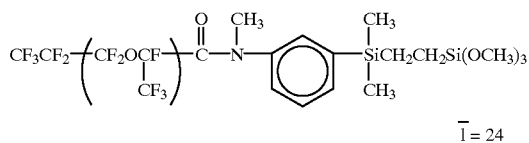

(13)

Composition 9 was cured as in Example 6. The cured rubber sheet was measured for physical properties, finding a JIS-A hardness of 32, a tensile strength of 35 kgf/cm², and an elongation of 310%.

Example 10

Composition 10 was prepared by mixing 100 parts of a fluorinated organic silicon compound of formula (14) shown below, 13.5 parts of the organic silicon compound of formula (13), 0.6 part of dibutyltin dilaurate, 0.54 part of N-β-(aminoethyl)-γ-aminopropyltriethoxysilane, 18.0 parts of ground silica having a mean particle size of 1.5 μm, and 9.6 parts of fumed silica having a specific surface area of 200 m²/g and trimethylsilyl-treated on the surface in a mixer, followed by deaeration.

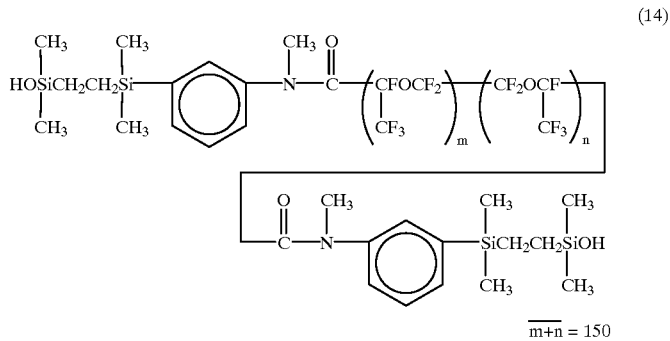

(14)

Composition 10 was cured as in Example 6. The cured rubber sheet was measured for physical properties, finding a JIS-A hardness of 25, a tensile strength of 34 kgf/cm², and an elongation of 380%.

Example 11: Depth curing

A glass test tube having a diameter of 20 mm and a length of 100 mm was filled with Composition 8 of Example 8, which was allowed to stand at 25° C. for 3 days for curing. The cured rubber piece was taken out of the tube and examined for curing to find that the piece was fully cured over its entire length from the top surface to the bottom of 100 mm. The rubber piece was measured for JIS-A hardness at positions near the top and the bottom. The results are shown below.

|  | JIS-A hardness |
| --- | --- |
| Near the top | 38 |
| Near the bottom | 37 |

Comparative Example

A curable composition was prepared by mixing 100 parts of a fluorinated organic silicon compound having hydrolyzable groups (methoxy groups) at both ends of formula (15) shown below, 0.6 part of dibutyltin dimethoxide, 0.3 part of a trimethoxysilane represented by [(CH₃)₂N]₂C=N(CH₂)₃Si(OCH₃)₃, 16.4 parts of ground silica having a mean particle size of 1.5 μm, 8.7 parts of fumed silica having a specific surface area of 200 m²/g and trimethylsilyl-treated on the surface in a mixer, followed by deaeration.

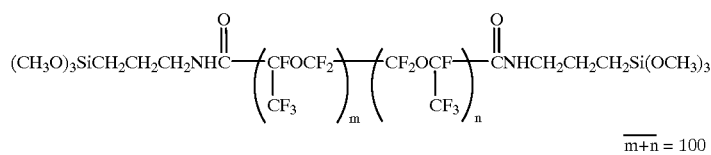

(15)

As in Example 11, this composition was examined for depth curing by introducing it into a test tube and allowing to stand at 25° C. for 3 days. Only a surface portion extending from the exposed surface to about 1 mm cured.

As seen from Example 11 and Comparative Example, the composition of the invention is improved in depth curing.

Reference Example 1

A 10-liter flask equipped with a stirrer, thermometer and condenser was charged with 2,000 g of a compound of formula (i) shown below, 320 g of 1,1,3,3-tetramethyldisiloxane, and 4,000 g of 1,3-bistrifluoromethylbenzene, which were heated at 80° C. with stirring.

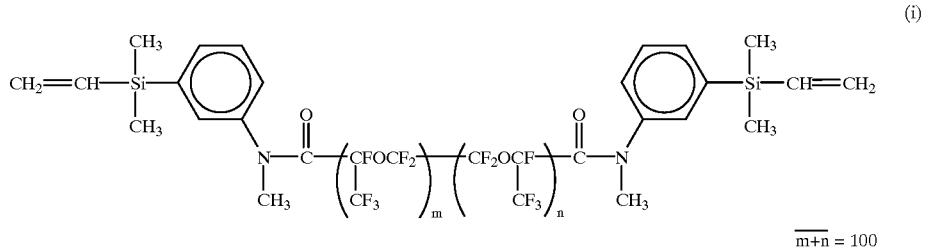

(i)

$\overline{m+n} = 100$

To the flask was added 0.3 g of a toluene solution containing a complex of chloroplatinic acid with 1,3-divinyl-1,1,3,3-tetramethyldisiloxane (in a concentration of 0.5% by weight calculated as platinum metal). Thereafter, agitation was continued for 4 hours at 75 to 85° C. for reaction to take place. At the end of reaction, the volatiles were stripped at 100° C. and 5 mmHg. There was obtained an oily substance having a specific gravity of 1.83, a refractive index of 1.316, and a viscosity of 17,100 centipoise, all measured at 25° C.

On proton-NMR and IR analysis, this substance was identified to have the structure shown by the following formula (ii). The IR spectrum is shown in FIG. 1.

Next, a 10-liter flask equipped with a stirrer, thermometer and condenser was charged with 578 g of methyl ethyl ketone, 39 g of water, 4,500 g of 1,3-bistrifluoromethylbenzene, 2.0 g of a catalyst in the form of carbon carrying 10% by weight of palladium thereon, and 1,800 g of the compound of formula (ii). The contents were agitated whereupon bubbling was observed. Agitation was continued for 5 hours and then at 50° C. for a further 3 hours to complete reaction. Activated carbon, 9 g, was added to the reaction mixture, which was agitated for 3 hours and filtered.

The filtrate separated into two layers. The lower layer was taken out and stripped at 100° C. and 5 mmHg. There was obtained an oily substance having a specific gravity of 1.84, a refractive index of 1.317, and a viscosity of 75,900 centipoise, all measured at 25° C.

Figure 2:
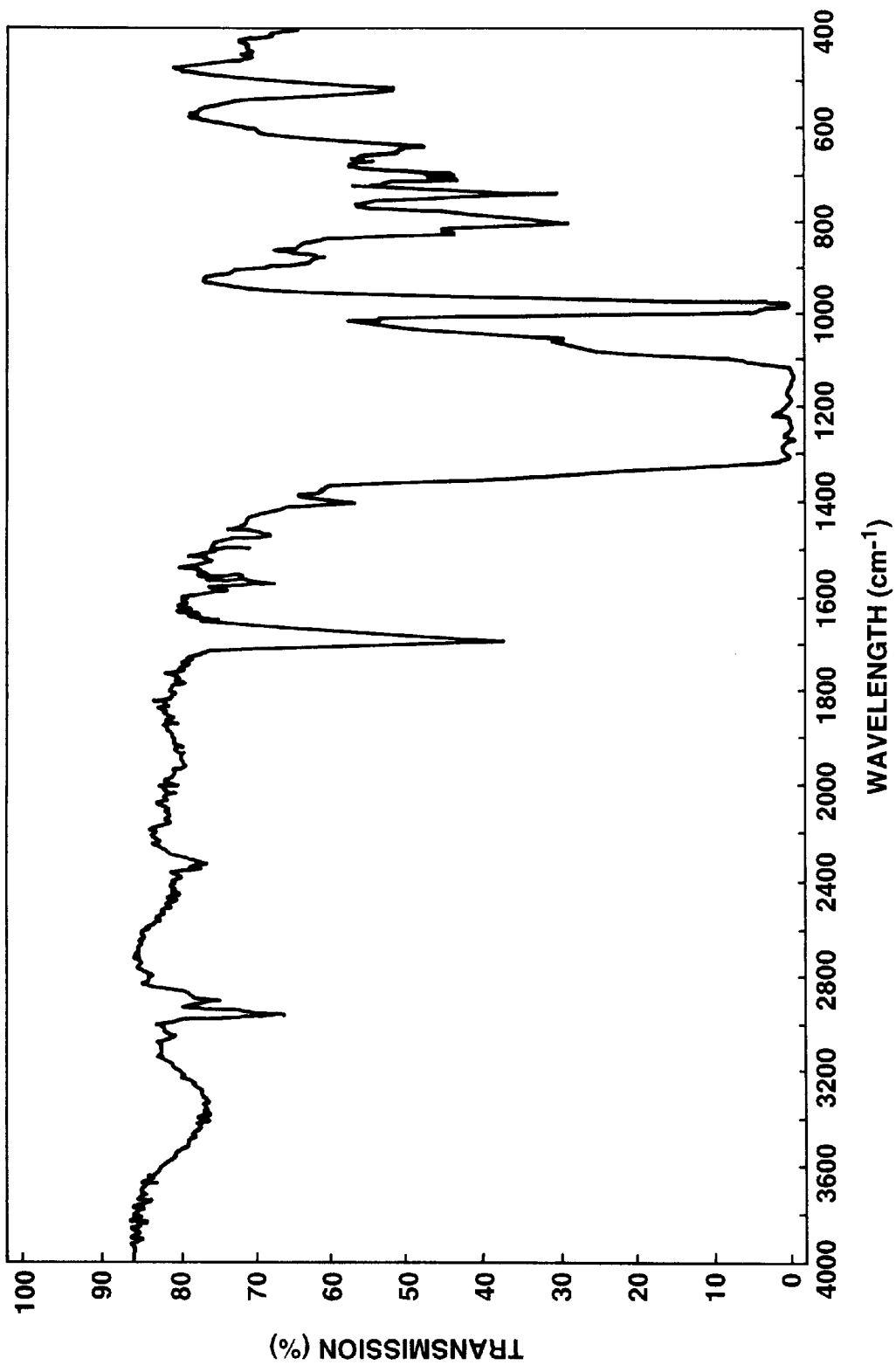
FIG. 2 is a diagram showing the IR absorption spectrum of the compound of formula (iii).

On proton-NMR and IR analysis, this substance was identified to have the structure shown by the following formula (iii). The IR spectrum is shown in FIG. 2.

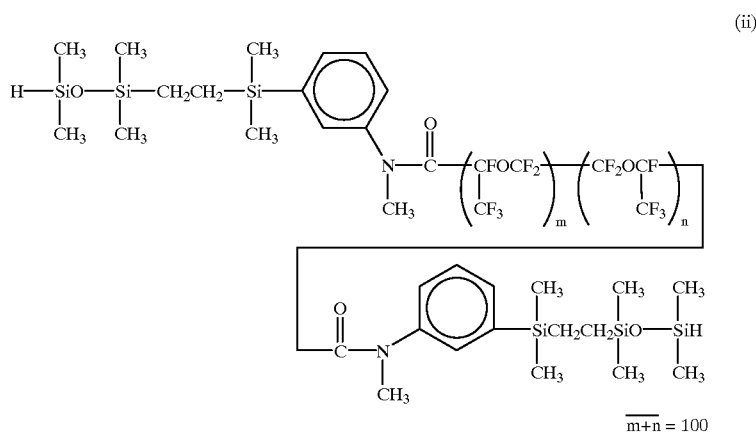

(ii)

$\overline{m+n} = 100$ (iii)

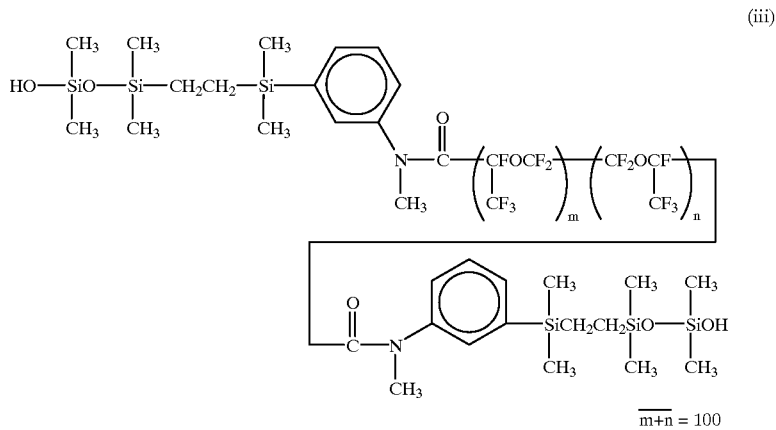

$\overline{m+n} = 100$

Reference Example 2

A 1-liter flask equipped with a stirrer, condenser, dropping funnel, and thermometer was charged with 1,000 g of the compound of formula (i) and heated at 60° C. To the flask was added 0.05 g of a toluene solution containing a complex of chloroplatinic acid with 1,3-divinyl-1,1,3,3-tetramethyldisiloxane (in a concentration of 0.5% by weight calculated as platinum metal). Thereafter, a mixture of 1.7 g of chlorodimethylsilane and 3.4 g of 1,3-bistrifluoromethylbenzene was added dropwise from the dropping funnel over about 10 minutes. After the completion of addition, the solution was ripened for one hour at 60° C. and then stripped at 100° C. and 5 mmHg. There was obtained a clear, light brown, oily substance.

On proton-NMR and IR analysis, this substance was identified to have the structure shown by the following formula (iv). The IR spectrum is shown in FIG. 2.

compound of formula (iv) and 463 g of 1,3-bistrifluoromethylbenzene and cooled to an internal temperature below 10° C. A mixture of 38.3 g of propylene oxide and 39.6 g of water was added dropwise from the dropping funnel over about 5 minutes. The solution was ripened for about one hour below 10° C. Activated carbon, 18.5 g, was added to the solution, which was agitated for 3 hours and filtered. The filtrate was stripped at 100° C. and 5 mmHg. There was obtained an oily substance having a refractive index of 1.316 and a viscosity of 45,600 centipoise, both measured at 25° C.

On proton-NMR and IR analysis, this substance was identified to have the structure shown by the following formula (v).

(iv)

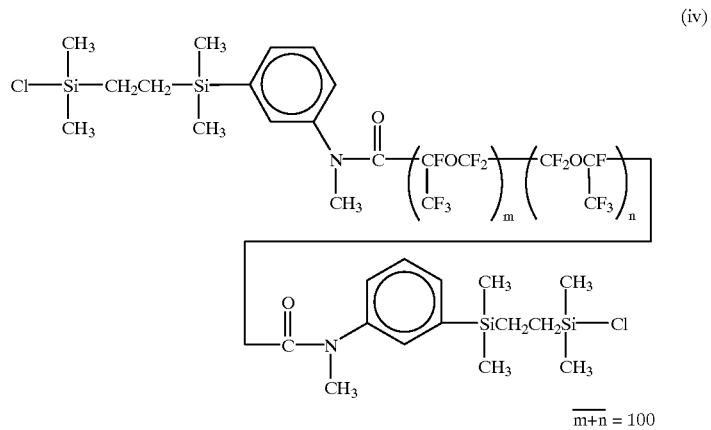

$\overline{m+n} = 100$

A 1-liter flask equipped with a stirrer, condenser, dropping funnel, and thermometer was charged with 926 g of the

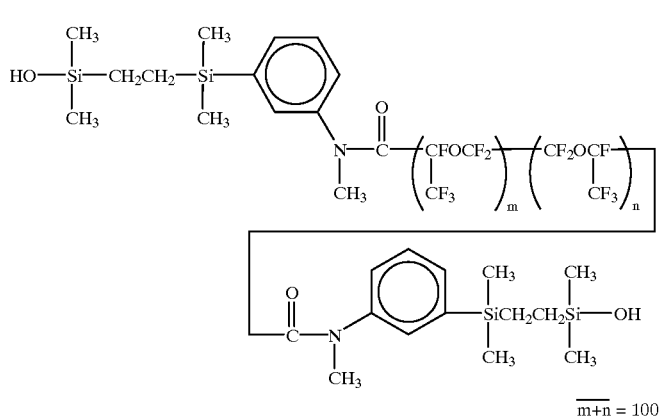

(v)

$\overline{m+n} = 100$

Japanese Patent Application No. 057496/1998 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A curable composition comprising (A) a fluorinated organic silicon compound of formula (1):

(1)

wherein Rf is a divalent fluorinated polyether group, $R^1$ is a substituted or unsubstituted divalent hydrocarbon group which may be separated by at least one atom selected from the group consisting of oxygen, nitrogen, silicon and sulfur atoms, and which may contain an amide or sulfonamide bond, and Z is a group of formula (2), (3) or (4):

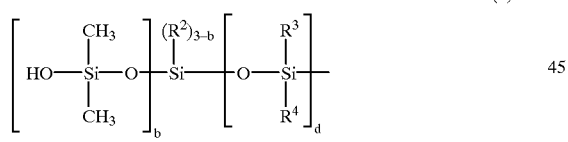

(2)

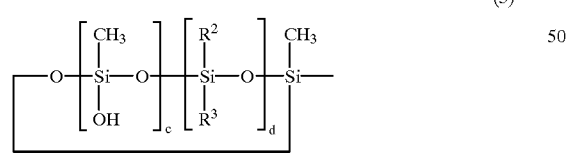

(3)

(4)

wherein $R^2$, $R^3$, and $R^4$ are independently monovalent organic groups, b and c each are equal to 1, 2 or 3, and d is an integer of 0 to 3, (B) an organic silicon compound of formula (5), (6) or (7):

(5)

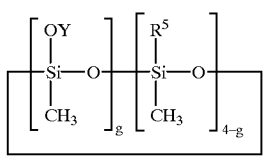

(6)

(7)

wherein Y is a monovalent organic group selected from the group consisting of $CH_3$—, $C_2H_5$—, $C_3H_7$—, $CF_3CH_2$—, $CH_3CO$—, $CH_2\!=\!C(CH_3)$—, $CH_3CH_2C(CH_3)\!=\!N$—,

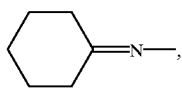

$(CH_3)_2N$—, $(C_2H_5)_2N$—, $CH_2\!=\!C(OC_2H_5)$—, and $(CH_3)_2C\!=\!C(OC_8H_{17})$—, $R^5$ is a monovalent organic group, $R^1$ and Rf are as defined above, letter e is equal to 2 or 3, f is equal to 1, 2 or 3, and g is equal to 2 or 3, and (C) a condensation accelerator.

2. The curable composition of claim 1, Rf is a group of formula (8)

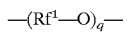

(8)

wherein $Rf^1$ is a straight or branched perfluoroalkylene group having 1 to 6 carbon atoms and q is an integer of 1–200.

3. The curable composition of claim 2, wherein Rf' has 1 to 3 carbon atoms and q is an integer of 2–150.

4. The curable composition of claim 3, wherein q is an integer of 2–100.

5. The curable composition of claim 1, wherein Rf is —$CF_2O$—, —$CF_2CF_2O$—, —$CF_2CF_2\,CF_2O$— or —$C(CF_3)FCF_2O$—.

6. The curable composition of claim 1, wherein $R^1$ has 2–20 carbon atoms and is alkylene, cycloalkylene, arylene, or a combination of alkylene and arylene, wherein some or all of the hydrogen atoms are optionally replaced by halogen atoms.

7. The curable composition of claim 1, wherein the divalent hydrocarbon group of $R^1$ is separated by at least one of the group consisting of —O—; —NR—, wherein R is hydrogen, $C_{1-10}$ alkyl, or aryl; —N=; —SiR'R", wherein R' and R" each are independently $C_{1-10}$ alkyl, or aryl; or —S—.

8. The curable composition of claim 1, wherein $R^2$, $R^3$ and $R^4$ are independently $C_{1-12}$ monovalent hydrocarbon, cycloalkyl, aryl, or alkyl, in which some or all of the hydrogen atoms are optionally replaced by halogen atoms.

9. The curable composition of claim 1, wherein $R^5$ is $C_{1-12}$ monovalent hydrocarbon, cycloalkyl, aryl, aralkyl or alkenyl, wherein some or all of the hydrogen atoms are replaced by halogen atoms.

10. The curable composition of claim 1, wherein $R^5$ is a group of formula (9)

$$Rf^2-R^1- \qquad (9)$$

wherein $Rf^2$ is a monovalent fluorinated polyether group and $R^1$ is as defined above.

11. The curable composition of claim 10, wherein $Rf^2$ is a divalent fluorinated polymer group which is blocked at one end with $CF_3O-$, $CF_3CF_2O-$, $CF_3CF_2 CF_2O-$, $(CF_3)_2 CFO-$ or $CF_3CF_2CF_2CF_2O-$.

12. The curable composition of claim 1, wherein the condensation accelerator is one or more of a metal salt or amine salt of an organic carboxylic acid, an organic acid, an ester of an organic titanic acid, an organic titanium compound, an aminoalkyl-substituted alkoxysilane, an amine compound or a salt thereof, an alkali metal salt of a lower fatty acid, a dialkyl hydroxylamine or a guanidyl compound.

13. The curable composition of claim 1, wherein the condensation accelerator is one or more of a tin salt of an organic carboxylic acid, an ester of an organic titanic acid, an organic titanium compound, an organic acid, or a guanidyl compound.

14. The curable composition of claim 13, wherein the condensation accelerator is one or more of dibutyltin dimethoxide, dibutyltin diacetate, dibutyltin dilaurate, butyltin tri-2-ethylhexoate, tin naphthenate, tin oleate, tin butyrate, titanium naphthenate, zinc naphthenate, para-toluenesulfonic acid, trifluoroacetic acid, trichloroacetic acid, picric acid, tetrabutyl titanate, tetra-2-ethylhexyl titanate, triethanolamine titanate, tetra(isopropenyloxy) titanate, organosiloxytitanium, β-carbonyltitanium, tetramethylguanidine or a silane or siloxane having a guanidyl group as shown below:

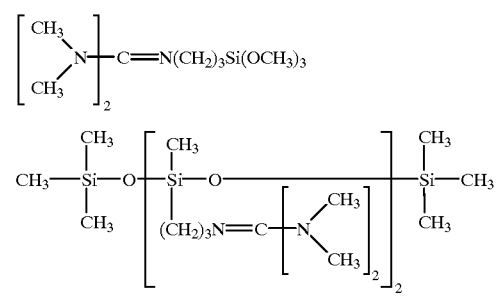

* * * * *